3,361,852
TERNARY POLYPROPYLENE COMPOSITIONS CONTAINING ETHYLENE/PROPYLENE AND ETHYLENE/VINYL ESTER COPOLYMERS
Howard D. Bassett, Middlesex, and John Latosky, Bound Brook, N.J., assignors to Union Carbide Corporation, a corporation of New York
No Drawing. Filed Sept. 15, 1965, Ser. No. 487,615
7 Claims. (Cl. 260—897)

ABSTRACT OF THE DISCLOSURE

Polypropylene compositions of improved impact strength and blush resistance are achieved by blending about 2–25% of each of ethylene/vinyl ester and ethylene/propylene copolymers therein.

This invention relates to novel polypropylene compositions which combine improved impact strength with blush resistance.

Solid polypropylene is recognized in the plastics industry as possessing great commercial potential because it is superior in several respects to polyethylene. For example, polypropylene has a higher melting point, lower density, and greater stiffness modulus than does polyethylene. Polypropylene can also be produced in either amorphous or crystalline form by variation of the polymerization catalyst.

Polypropylene has been used for the manufacture of shaped articles, but some of its inherent deficiencies have, unfortunately, limited its use in many other applications for which it would otherwise be well suited. For example, its low impact strength, i.e., high shock sensitivity at temperatures below room temperature, is a disadvantage which has precluded its use for fibers, films, and other extruded and molded items, and, in particular, for containers and packaging materials.

In order to remedy the low impact resistance possessed by polypropylene, rubber products, such as polyisobutylene, have been added. While addition of rubbers has resulted in polypropylene compositions having improved impact resistance, the improvement has been achieved at the expense of obtaining a more opaque product having less stiffness, i.e., a lower secant modulus, and lower heat and air stability than unmodified polypropylene.

Combinations of polyethylene and polyisobutylene or polyethylene and ethylene-propylene copolymers with polypropylene have improved impact strength but such combinations are handicapped by a severe-blushing phenomenon which occurs when the products are flexed beyond their elastic limit. This effect, which is possibly due to phase separation, is for the most part, irreversible. Consequently, articles molded or shaped from these high impact polypropylene compositions of the prior art when struck, bumped sharply or flexed show unsightly bruises which detract from the aesthetic appearance of the articles and hamper their commercial use.

Thus, there exists in the art a need for polypropylene having high impact strength and greater blush resistance than is available with presently known polypropylene compositions.

It has now been surprisingly discovered that polypropylene composititons having high impact strength and blush resistance can be obtained by the incorporation of an ethylene/vinyl ester copolymer, containing an ester moiety having from about 2 to 18 carbon atoms therein, into polypropylene compositions comprising a polypropylene having a density above about 0.89 and amorphous ethylene/propylene copolymer.

It is an unusual phenomenon that many related polymers give sharply contrasting results when used in an attempt to increase the impact strength of polypropylene. Thus, for example, a polyethylene/polyisobutylene system is inferior to a polyethylene/ethylene-propylene copolymer system while polybutadiene or polyisoprene blended with or without polyethylene lend even less impact strength improvement to polypropylene.

The polypropylene compositions of the invention generally comprise from about 50 percent by weight to about 96 percent by weight of polypropylene, from about 2 to 25 percent by weight of ethylene/propylene copolymer and from about 2 to about 25 percent by weight of ethylene/vinyl ester copolymer. Preferred polypropylene compositions comprise from about 65 to about 92 percent by weight of polypropylene, from about 5 to 15 percent by weight of ethylene/propylene copolymer, and from about 5 to about 20 percent by weight of ethylene/vinyl ester copolymer. The combined amount of ethylene/propylene copolymer and ethylene/vinyl ester copolymer in these polypropylene compositions is preferably less than 35 percent by weight because of the desirable flexural characteristics of such mixtures.

The polypropylenes useful in the compositions of this invention are normally solid polymer of propylene having a melt flow at 44 p.s.i. and 230° C. below about 12 g./10 min. and preferably from about 2.0 to about 0.01 g./10 min. While the density of the polypropylene used is not particularly critical, polypropylenes having a density above about 0.89 g./cc. are generally preferred. The polypropylene can be either amorphous or crystalline or partially crystalline. Amorphous ethylene/propylene copolymers are useful over a wide range of combined ethylene to combined propylene ratios, e.g., from about 25 percent by weight to about 95 percent by weight combined ethylene and from about 5 percent by weight to about 75 percent by weight combined propylene. The preferred amorphous ethylene/propylene copolymers comprise from about 35 percent by weight to about 80 percent by weight combined ethylene and from about 20 percent by weight to about 65 percent by weight combined propylene. The ethylene/propylene copolymers employed herein are normally solid copolymers having a melt index at 190° C. and 44 p.s.i. of less than about 1000 deg./min. and preferably less than about 100 deg./min.

By the term amorphous ethylene/propylene copolymers is meant those ethylene/propylene copolymers which are less than about 20 percent crystalline. The preferred ethylene/propylene copolymers are completely non-crystalline.

The three components of the composition herein described can be mixed together in any order using conventional hot processing equipment well known to the plastics art. For example, batch type equipment such as a Banbury mixer or a two-roll mill can be employed, or a finely ground mixture can be compounded in a screw extruder. The compositions of this invention, as other thermoplastic compositions, can contain stabilizers, antioxidants, colorants, processing aids, pigments, and other additives if desired, in normal and conventional amounts.

The polypropylene compositions of this invention can be used to produce films, filaments, rods, protective coatings, molded and extruded shaped articles, and the like, by procedures known in the art. These compositions form products which are particularly useful where low temperatures and shock are likely to be encountered.

The following descriptions and examples illustrate the invention and should not be construed as limitative thereof.

The preferred ethylene/vinyl ester copolymers of this invention are the ethylene/vinyl acetate copolymers although others such as ethylene/vinyl propionate or ethylene/vinyl butyrate copolymers can also be used if desired. The preparation of ethylene/vinyl acetate copolymers is described in "Vinyl and Related Compounds," C. E. Schildknecht, pages 531–3, John Wiley & Sons, Inc., New York City, 1952.

It is preferred to employ ethylene/vinyl acetate copolymers having at least 5% vinyl acetate by weight copolymerized therein. It is particularly preferred to employ ethylene/vinyl acetate copolymers having from about 8 to 40% by weight of vinyl acetate copolymerized therein and having a melt index of about 1 to 100 deg./min.

The invention is further described by the examples which follow in which all parts and percentages are by weight unless otherwise specified.

Control A

Seventy-five parts of polypropylene having a melt flow of 0.7 deg./min. was blended with 25 parts of an ethylene/vinyl acetate copolymer (80:20) having a melt index of about 2 deg./min. and containing 0.4% of ditertiary butyl para cresol as an anti-oxidant in a Banbury mixer in an 8 minute cycle at a 200° C. batch discharge temperature. Test pieces, 1/8" x 1/2" x 8" tensile bars, were produced on an injection molding machine at 140° F. mold temperature and 700 p.s.i. The test pieces were conditioned for a minimum of 40 hours at 23° C. and 50 percent relative humidity prior to testing.

The following tests were employed in this invention.

Test

| Test | |
|---|---|
| Melt flow and index (deg./min. or g./10 min. at 44 p.s.i. and 230° C. for polypropylene, 190° C. for ethylene propylene copolymer) | D-1238-57T |
| Density, g./cc. | D-1505-57T |
| Vicat softening temperature, ° C. | D-1525-58T |
| Rockwell Hardness, R Scale | D-785-60T |
| Tensile strength, p.s.i. | D-639-58T |
| Elongation, percent | D-638-58T |
| Yield strength, p.s.i. | D-638-58T |
| Secant modulus, 10³ p.s.i. | D-638-58T |
| Izod impact strength, ft. lbs./in. | D-256-56 |
| Brittle temperature, ° C. | D-746-57T |
| Heat deflection, ° C. at 66 p.s.i. | D-648-56 |

The drop test consisted in observing the height in inches at which a test plaque 1/8" thick cracked under a 4 pound weight dropped upon it.

Blushing of each specimen was determined visually by observing whether or not test specimens whitened upon flexing. The observations were recorded as "yes" or "no" indicating that the specimens remained clear or became opaque.

The test results obtained with the blend from Control A are presented in the table.

EXAMPLE

The procedure described in Control A was followed with the exception that the 75 parts of polypropylene was blended with 15 parts of ethylene/vinyl acetate copolymer (80:20) having a melt index of 2 deg./min. and 10 parts of ethylene/propylene rubber containing about 58 percent of ethylene copolymerized therein. The test data obtained with this mixture are also presented in the table together with a Control B consisting of 80 parts of polypropylene having a melt flow of 0.7 deg./min. blended with 20 parts of ethylene/propylene rubber containing about 58 percent of ethylene copolymerized therein.

TABLE.—PHYSICAL PROPERTIES OF POLYPROPYLENE COMPOSITIONS

| Test | Control A | Example | Control B |
|---|---|---|---|
| Melt flow, deg./min. | 1.16 | 1.1 | 1.5 |
| Density, g./cc. | 0.9110 | 0.8983 | 0.8925 |
| Vicat softening point, ° C. | 137 | 135 | |
| Rockwell Hardness | R77 | R39 | R53 |
| Tensile Strength, p.s.i. | 4,100 | 3,600 | 3,700 |
| Elongation, percent | 56 | 117 | 55 |
| Yield strength, p.s.i. | 3,700 | 3,000 | 3,100 |
| Secant modulus, p.s.i. | 117×10³ | 92×10³ | 115×10³ |
| Izod notched impact strength, ft. lbs./in. at 23° C. | 10.1 | 16.0 | 8.3 |
| Izod notched impact strength ft. lbs./in. at 0° C. | 0.67 | 13.0 | 2.0 |
| Izod notched impact strength, ft. lbs./in. at -18° C. | 0.47 | 1.6 | 0.87 |
| Brittle temp., ° C. | 0 | -20 | -9 |
| Drop test, in. | 47 | 65 | 53 |
| Deflection Temp., ° C. | | 103 | 99 |
| Blush | Yes | No | Yes |

These tests demonstrated that only the polypropylene composition of the example containing both ethylene/vinyl acetate copolymer and ethylene/propylene rubber was completely resistant to blushing while still exhibiting good impact strength properties.

Although the invention has been described in its preferred forms with a certain degree of particularity, it is understood that the present disclosure has been made only by way of example and that numerous changes may be made without departing from the spirit and scope of the invention.

What is claimed is:

1. Polypropylene composition having high impact strength and high blush resistance which comprises from about 50 to about 96 percent by weight of a normally solid polypropylene having a melt flow of less than about 12 g./10 min., from about 2 to about 25 percent by weight of amorphous ethylene/propylene copolymer containing from about 5 to 75 percent by weight of combined ethylene and from about 25 to 95 percent by weight of combined propylene and having a melt index of less than about 1000 deg./min., and from about 2 to about 25 percent by weight of an ethylene/vinyl ester copolymer containing an ester moiety having from about 2 to 18 carbon atoms therein and having a melt index of about 1 to 100 deg./min.

2. Polypropylene composition as claimed in claim 1 wherein the combined amount of ethylene/propylene copolymer and ethylene/vinyl ester copolymer in said polypropylene composition is less than about 35% by weight.

3. Polypropylene composition as claimed in claim 1 wherein said polypropylene has a melt flow of from about 0.1 g./10 min. to about 2.0 g./10 min., said ethylene/propylene copolymer has a melt index of from about 0.1 deg./min. to about 8 deg./min. and said ethylene/vinyl ester copolymer has a melt index of less than about 100 deg./min.

4. Polypropylene composition as claimed in claim 1 wherein said ethylene/vinyl ester copolymer is an ethylene/vinyl acetate copolymer.

5. Polypropylene composition as claimed in claim 4 wherein said ethylene/vinyl acetate copolymer contains at least about 80 percent by weight of ethylene copolymerized therein and has a melt index of less than about 10 deg./min.

6. Polypropylene composition as claimed in claim 4 wherein the amount of said ethylene/vinyl acetate copolymer in said polypropylene composition is less than 15% by weight.

7. Polypropylene composition as claimed in claim 6 wherein said polypropylene has a melt flow of from about 0.1 g./10 min. to about 2.0 g./10 min.

References Cited

UNITED STATES PATENTS

| 3,036,987 | 5/1962 | Ranalli | 260—897 |
| 3,200,173 | 8/1965 | Schilling | 260—897 |
| 3,248,359 | 4/1966 | Maloney | 260—897 |
| 3,262,992 | 7/1966 | Holzer et al. | 260—897 |

GEORGE F. LESMES, *Primary Examiner.*

M. TILLMAN, *Examiner.*

T. G. FIELD, Jr., *Assistant Examiner.*

UNITED STATES PATENT OFFICE

CERTIFICATE OF CORRECTION

Patent No. 3,361,852 January 2, 1968

Howard D. Bassett et al.

It is hereby certified that error appears in the above numbered patent requiring correction and that the said Letters Patent should read as corrected below.

Column 2, line 51, column 3, lines 32,35,45, and 75, and column 4, lines 5, 14, 48, 52, 61, 63, and 71, for "deg.", each occurrence, read -- dg. --.

Signed and sealed this 29th day of April 1969.

(SEAL)
Attest:

Edward M. Fletcher, Jr.
Attesting Officer

EDWARD J. BRENNER
Commissioner of Patents